(12) United States Patent
Steinhauser

(10) Patent No.: US 11,907,238 B2
(45) Date of Patent: Feb. 20, 2024

(54) METADATA-BASED SOFTWARE ARTIFACT SEARCH

(71) Applicant: SAP SE, Walldorf (DE)

(72) Inventor: Martin Steinhauser, Mannheim (DE)

(73) Assignee: SAP SE, Walldorf (DE)

( * ) Notice: Subject to any disclaimer, the term of this patent is extended or adjusted under 35 U.S.C. 154(b) by 530 days.

(21) Appl. No.: 16/549,697

(22) Filed: Aug. 23, 2019

(65) Prior Publication Data

US 2021/0056100 A1 Feb. 25, 2021

(51) Int. Cl.
  *G06F 16/9535* (2019.01)
  *G06F 16/951* (2019.01)
  *G06F 16/248* (2019.01)
  *G06F 16/2455* (2019.01)
  *G06F 8/20* (2018.01)

(52) U.S. Cl.
  CPC .............. *G06F 16/248* (2019.01); *G06F 8/24* (2013.01); *G06F 16/2455* (2019.01)

(58) Field of Classification Search
  CPC ...... G06F 16/248; G06F 8/24; G06F 16/2455; G06F 8/36; G06F 8/71; G06F 16/335
  See application file for complete search history.

(56) References Cited

U.S. PATENT DOCUMENTS

| | | | | |
|---|---|---|---|---|
| 2007/0250405 | A1* | 10/2007 | Ronen | G06Q 30/0641 705/26.1 |
| 2010/0106705 | A1* | 4/2010 | Rush | G06F 8/36 707/723 |
| 2012/0124547 | A1* | 5/2012 | Halbedel | G06F 16/903 707/769 |
| 2013/0138690 | A1* | 5/2013 | Reisbich | G06Q 10/067 707/E17.014 |
| 2014/0089894 | A1* | 3/2014 | Elshishiny | G06F 8/70 717/120 |
| 2014/0156634 | A1* | 6/2014 | Buchmann | G06F 16/26 707/714 |

OTHER PUBLICATIONS

"Introduction to SAP Fiori Elements," available at: https://experience.sap.com/fiori-design-web/smart-templates/, 6 pages, retrieved on Jun. 25, 2019.

* cited by examiner

*Primary Examiner* — Etienne P Leroux
*Assistant Examiner* — Oscar Wehovz
(74) *Attorney, Agent, or Firm* — Klarquist Sparkman, LLP

(57) ABSTRACT

Software feature metadata objects and software artifact search, identification, and tracking is provided herein. A software artifact can have an associated software feature metadata object. A software feature metadata object can include metadata describing or defining at least in part the software artifact. The software feature metadata object can include one or more defined queries for identifying the software artifact in applications or programming code. The software feature metadata object can include one or more identifiers for composite software artifacts which integrate the software artifact corresponding to the software feature metadata object. The software feature metadata object can be accessed to obtain metadata about the corresponding software artifact for tracking usage, integration, or other activities, which can be provided for reporting or analysis. The software feature metadata object can include a multiplicity of metadata, such as identification queries, for multiple application sources where the software artifact may be integrated.

16 Claims, 9 Drawing Sheets

600 →

```
[
  {
    type: "feature",
    key: "treetable",
    description: "hierarchal display of table"
    source: "./webapp/manifest.json",
    sourceType: "json",
    searchQueryLanguage: "XPATH",
    searchQuery: "//sap.ui.generic.app//component/
    settings[contains(tableType,"TreeTable")]",
    featureOccurrences: ["ListReport", "ObjectPage"],
    documentationLink: "https://ui5.sap.com/#/topic/
    33c2b0d5bce24b30b1f05dbfe791f125",
  }, ...
  {
    type: "feature",
    key: "ListReport",
    description: "List Report"
    source: "./webapp/manifest.json",
    sourceType: "json",
    searchQueryLanguage: "XPATH",
    searchQuery: "//sap.ui.generic.app/pages/
    component[contains(name,"sap.suite.ui.generic.template.ListReport")]",
    featureOccurrences: [],
    documentationLink: "",
  }, ...
  {
    type: "feature",
    key: "ovp",
    description: "Overview Page"
    source: "./webapp/manifest.json",
    sourceType: "json",
    searchQueryLanguage: "JavaScript",
    searchQuery:
        "function checkForOVP(oManifest) {
        return oManifest["sap.ovp"];
    }",
    featureOccurrences: [],
    documentationLink: "//documentation/pages/OverviewPage.doc",
  },...
]
```

601 — first feature block (treetable)
603 — second feature block (ListReport)
605 — third feature block (ovp)

FIG. 6

METADATA-BASED SOFTWARE ARTIFACT SEARCH

BACKGROUND

Software code can be made available for use in developing or customizing software applications. However, tracking or discovering uses of available software code across independently developed or customized applications can be difficult, where possible at all, and are often performed using improvised or manual techniques. In some situations, code searches analyzing the code of software applications may be available, but can be inaccurate or require excessive resources to perform. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of identifying programming code is provided herein. A search query for a programming feature can be received. The search query can include a description of the programming feature. A collection of feature definitions in a feature library of programming features can be searched. The collection of feature definitions can include feature metadata objects respectively mapping programming features to software artifacts via queries respectively stored in the feature metadata objects. Responsive to finding a match, a feature query that finds the programming feature can be outputted. The feature query can be obtained from a feature metadata object mapping the programming feature to software artifacts.

A method of searching code segments, implemented in computer-readable media, is provided herein. A set of available programming features from a feature library can be displayed. A selection of a target programming feature from the set of available programming features can be received. A feature query can be obtained via a feature metadata object of the target programming feature. The feature query can be executed against an application library having one or more programming applications. Results of the executed feature query can be displayed, and can include applications having the target programming feature.

A system of application feature identification that can perform software artifact discovery is provided herein. A request for available features of a feature library can be received. The feature library can include one or more feature metadata objects respectively defining one or more available features. One or more feature identifiers of the available features of the feature library can be provided based on the received request. A selection of a target feature of the one or more available features can be received. The selection can include a target feature identifier. A target feature metadata object in the feature library can be accessed based on the target feature identifier from the received selection. The target feature metadata object can represent a software artifact encapsulating the target feature. A target feature query object can be retrieved from the target feature metadata object. The target feature query can define a query for identifying programming code sources having the software artifact encapsulating the target feature defined in the target feature metadata object. A search can be executed based on the target feature query object against a programming code library having programming code sources. Results based on the executed search can be received. The results can include programming code source identifiers identifying programming code sources having the software artifact encapsulating the target feature identified in the target feature metadata object. The programming code source identifier results of the executed search can be provided.

The foregoing and other objects, features, and advantages of the invention will become more apparent from the following detailed description, which proceeds with reference to the accompanying figures.

BRIEF DESCRIPTION OF THE DRAWINGS

FIG. 6 depicts example software feature metadata object definitions.

DETAILED DESCRIPTION

EXAMPLE 1—OVERVIEW

Figure 1:
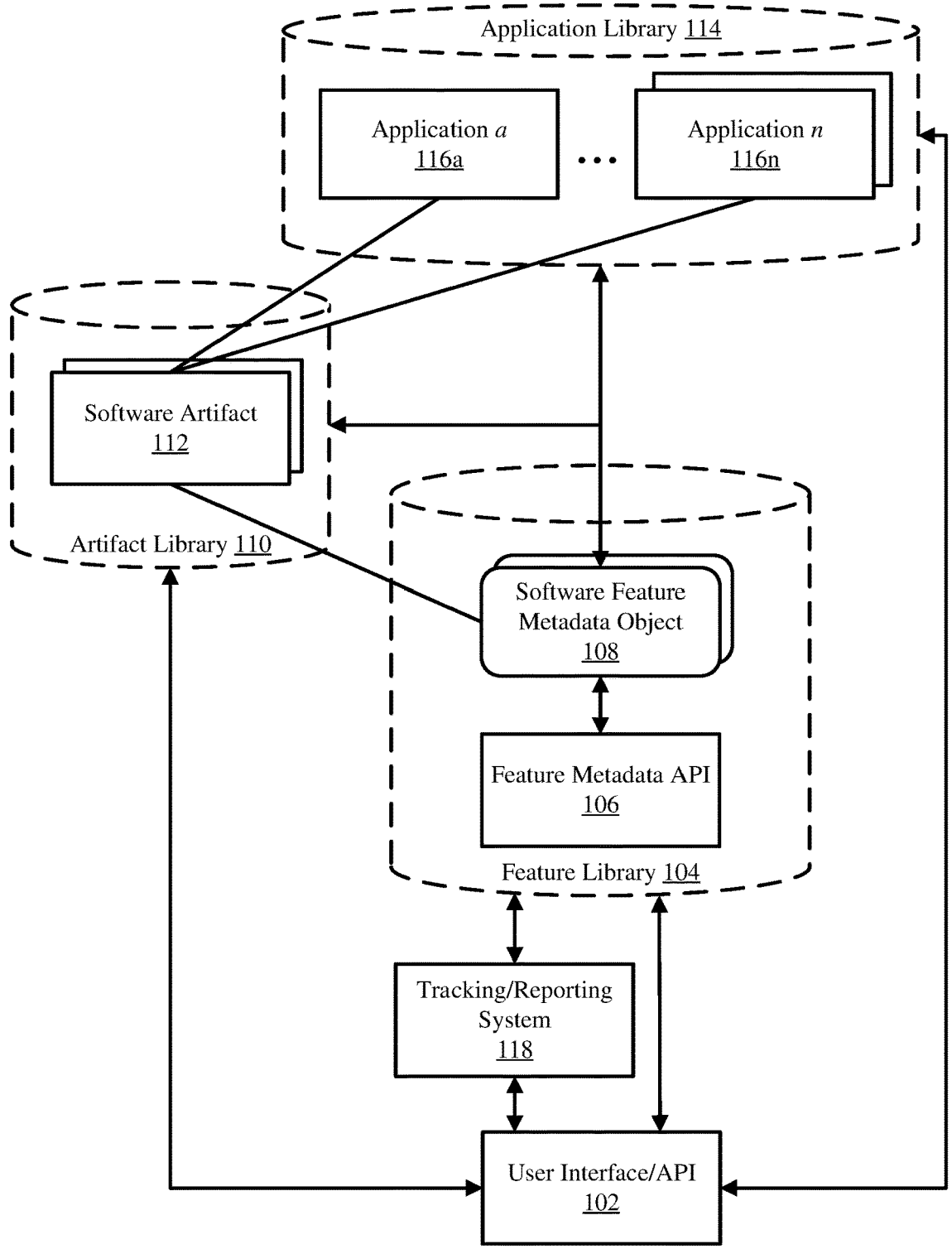
FIG. 1 is a block diagram of an example system implementing software feature metadata objects and metadata-based code search functionality.

Customizable software and software interfaces are becoming increasingly common and sought-after, particularly in cloud or software as a service (SaaS) applications. Customization software components or other software artifacts are often made available for use in developing customized applications which can run on or interface with enterprise applications. However, even in a controlled or regular development environment, it is often difficult, when even possible, to track usage of the available software artifacts.

Developers of such available software artifacts often want to know the extent of usage of the various software artifacts. Knowing the extent of usage of artifacts can help with knowing which artifacts are more popular and often used, and so should be maintained or further developed or enhanced, while knowing which artifacts can be retired (and so no longer spending resources on). Further, identifying which applications use which artifacts can help in rolling out new versions of an artifact, or understanding the impact of updating an artifact. Further, understanding where a software artifact is being used (e.g. which kinds of software programs) can help facilitate development of new functionality or new artifacts.

Software feature metadata objects can provide comprehensive functionality for identifying software applications or programming code which integrates software artifacts corresponding to the software feature metadata objects. A software feature metadata object can store metadata describing a software feature implemented in a corresponding software artifact, and can include specific information for searching for and identifying the software artifact in applications.

A software feature metadata object can be developed at design time, along with its corresponding software artifact. Thus, the software feature metadata object can include detailed, specific metadata describing, identifying, searching for, or otherwise accessing the software artifact. This detailed metadata can result in higher quality search results to find applications using the software artifact, and can result in higher levels of confidence that the search results are accurate and complete or nearly complete for a given source (e.g. application library).

Software artifacts may also include metadata, which can identify the software artifact or identify one or more software features in the software artifact. Metadata in a software artifact can be accessible to the software feature metadata objects, and can be searchable for identifying the software artifact, or for identifying a software feature in the software artifact. Thus, a software feature metadata object can be used to access metadata in or associated with a software artifact and search that metadata for information identifying the software artifact or a software feature.

Further, the software feature metadata objects can be centrally stored and made broadly available, creating a single point at which to perform software artifact usage analysis, even when the software artifact may be used across multiple systems or environments. This can also provide an effective set of data for making the software artifacts available as well, such as in a feature library including the software feature metadata objects. The software feature metadata objects also allow other developers or users that did not develop the corresponding software artifact to obtain meaningful information about the software artifact, and perform analysis about the usage or impact of the software artifact, without needing to know details about the implementation (e.g. the actual programming code) of the software artifact.

Thus, the software feature metadata objects can be searched to find available software features and their respective software artifacts (e.g. programming code) for use, or to find instances of integration of the software artifacts across applications or other software artifacts, without requiring detailed knowledge of the software artifact or its implementation, or of the searched applications or their implementation.

Software feature metadata object functionality can be provided in data management software, ERP software, data analytics software, application development or IDE software, or other interface or customization software systems. An example of such a tool is SAP Fiori™ technology by SAP SE of Walldorf, Germany.

EXAMPLE 2—EXAMPLE SYSTEM THAT SEARCHES APPLICATIONS FOR SOFTWARE FEATURES BASED ON SOFTWARE FEATURE METADATA OBJECTS

FIG. 1 is a block diagram of an example system 100 implementing software feature metadata objects and metadata-based code search functionality.

An artifact library 110 can include a collection of software artifacts, such as software artifact 112. The artifact library 110 can store the software artifacts 112, or, in some embodiments, store references to the software artifacts 112 stored elsewhere. For example, the artifact library 110 can be a database maintaining the software artifacts 112, or references to the software artifacts. The artifact library 110 can be accessed through a user interface/API 102, which can provide functionality for retrieving, viewing, editing, or otherwise using software artifacts 112.

An application library 114 can include a collection of software applications or programming code, such as applications 116a-n. The application library 114 can store the applications 116a-n, or, in some embodiments, store references to the applications stored elsewhere. For example, the application library 114 can be a database maintaining the applications 116a-n, or references to the applications. The application library 114 can be accessed through a user interface/API 102, which can provide functionality for retrieving, viewing, editing, installing, executing, or otherwise using the applications 116a-n.

An application 116a-n can incorporate one or more software artifacts 112, either directly or by reference. For example, a software artifact 112 can be a code segment, such as a programming library, which can be incorporated into one or more applications 116a-n in the application library. Thus, an application 116a-n can be composed of, at least in part, one or more software artifacts 112.

In some embodiments, the application library 114 and the artifact library 110 can be integrated, with an integrated interface 102, storing both applications 116a-n and their component parts, e.g. software artifacts 112.

A feature library 104 can include a collection of software feature metadata objects, such as software feature metadata object 108. The feature library 104 can store the software feature metadata objects 108, or, in some embodiments, store references to the software feature metadata objects stored elsewhere. For example, the feature library 104 can be a database maintaining the software feature metadata objects, or references to the software feature metadata objects. The feature library 104 can be accessed through a user interface/API 102, which can provide functionality for retrieving, viewing, editing, or otherwise using software feature metadata objects 108.

A software feature metadata object 108 can be associated with a software artifact 112. An associated software feature metadata object 108 can define or otherwise describe, at least in part, its associated software artifact 112. For example, a software feature metadata object 108 can describe a software feature embodied by its associated software artifact 112. Such a description in a software feature metadata object 108 can include metadata for the software artifact 112. The software feature metadata object 108 can include metadata for accessing the artifact library 110 storing its associated software artifact 112, and further for accessing the software artifact itself 112 in the artifact library. The software feature metadata object 108 can include metadata for accessing an application library 114 storing applications 116a-n that incorporate or are otherwise integrated with the software feature metadata object's associated software artifact 112. Further, the software feature metadata object 108 can include metadata for accessing, searching, or otherwise identifying the applications 116a-n which incorporate the software artifact 112 associated with the software feature metadata object.

The feature library 104 can include a feature metadata API 106. The feature metadata API 106 can include one or more methods for accessing the software feature metadata objects 108 in the feature library 104, or can otherwise define access to the collection of software feature metadata objects in the feature library. For example, the feature metadata API 106 can provide functionality for searching or identifying software feature metadata objects 108 in the feature library 104. Thus, the feature library 104 can provide functionality for accessing the artifact library 110, the software artifacts 112, the application library 114, or the applications 116a-n, or a combination thereof, via the feature metadata API 106 and the software feature metadata objects 108. For example, the feature metadata API 106 can be used to access software artifacts 112 or applications 116a-n (or a combination thereof) via the software feature metadata objects 108 in the feature library 104.

The feature metadata API 106 can be accessed by a user interface/API 102 to provide functionality for accessing software feature metadata objects 108 in a feature library 104. In some embodiments, the feature metadata API 106 can be integrated with, in whole or in part, the user interface/API 102.

In some embodiments, the user interface/API 102 can be separate interfaces for the respective feature library 104, the artifact library 110, and the application library 114. In other embodiments, the user interface/API 102 can be integrated for accessing any combination of the libraries 104, 110, 114.

A tracking and/or reporting system 118 can access the feature library 104, such as through the feature metadata API 106, for providing functionality to track or report on software artifact 112 use based on the software feature metadata objects 108. In this way, tracking or analyzing software artifact 112 usage in applications 116a-n can be facilitated in a well-defined and accurate manner by the software feature metadata objects 108 in the feature library 104 without requiring separately accessing the artifact library 110 and the application library 114 directly, and without requiring detailed information about the software artifacts 112 and the applications 116a-n. In some embodiments, the tracking/reporting system 118 can be integrated, in whole or in part, with the user interface/API 102, or with another data analysis or data management program.

In practice, the systems shown herein, such as system 100, can vary in complexity, with additional functionality, more complex components, and the like. For example, there can be additional functionality within the software feature metadata objects 108, the feature metadata API 106, the feature library 104, the user interface/API 102, the tracking/reporting system 118, and so on. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the software artifacts 112, the software feature metadata objects 108, instructions for implementing the user interface/API 102 or tracking/reporting system 118, the input, output and intermediate data of running the user interface/API 102 or tracking/reporting system 118 or executing on the software feature metadata objects 108 (e.g., the data pertaining to DOM, the properties of UI control elements as described below, etc.), or the libraries 104, 110, 114, and the like can be stored in one or more computer-readable storage media or computer-readable storage devices. The technologies described herein can be generic to the specifics of operating systems or hardware and can be applied in any variety of environments to take advantage of the described features.

EXAMPLE 3—EXAMPLE METHOD THAT SEARCHES A COLLECTION OF SOFTWARE FEATURE METADATA OBJECTS

Figure 2:
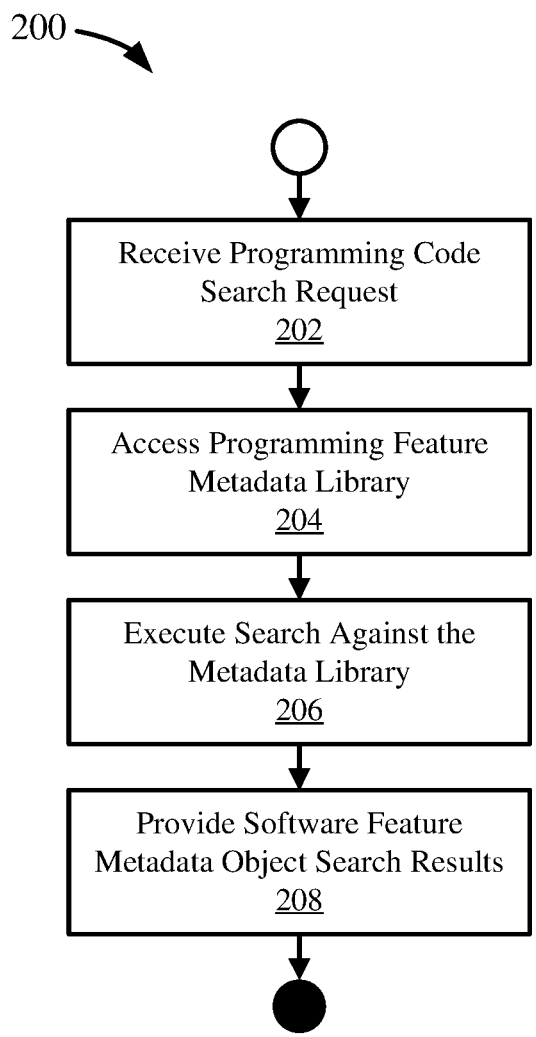
FIG. 2 is a flowchart of an example method of searching a collection of software feature metadata objects.

FIG. 2 is a flowchart of an example method 200 of searching a collection of software feature metadata objects and can be implemented, for example, by the system described in FIG. 1.

At 202, a programming code search request can be received. The request can include a description of a software feature (which is sought). For example, the request can include one or more keywords or phrases describing the software feature for which programming code is sought. In some cases, the request can include specific identifiers for a specific software feature, such as the name of the feature, or an identifier (e.g. ID number) for the software feature metadata object representing the software artifact of the feature sought. In some cases, the request can be empty, or otherwise be a request for all available software features. The request can include other search criteria as well, such as compatibility information or maintenance status. The request can include one or more target locations to search, such as an identifier for a particular software feature library. In some cases, the request (such as may be made by a build quality scan tool) can include a particular key or identifier for a target feature. In such cases, the request may include a tag setting a value in the applicable software feature metadata object to indicate or otherwise provide a warning or error if the software feature is still in use when it is deprecated or retired. In some cases, a request can be for a report, such as a management report, indicating the most used or least used software features, or a ranking of the available features.

At 204, a programming feature metadata library can be accessed. The programming feature metadata library can include the feature library as described herein. The programming feature metadata library can include a database system, a data file, a collection of data files, or other storage structure for software feature metadata objects. The programming feature metadata library accessed at 204 can be, at least in part, identified in the request received at 202. In some cases, multiple programming feature metadata libraries can be accessed at 204, with the remainder of the process 200 running for each library accessed (either sequentially or in parallel). Accessing the library can include logging in or otherwise providing security data to obtain access rights or confirm access rights.

At 206, a search can be executed against the metadata library accessed at 204. The search can be based, at least in part, on the request received at 202. In some cases, the request received at 202 can include a search string which can be executed directly against the metadata library. In other cases, the request can include search information or a partial search string, which can be formatted for execution at 206. In some embodiments, a search string or query can be generated at 206, before being executed against the metadata library.

At 208, the search results of software feature metadata objects can be provided. The search results can include zero or more software feature metadata objects, or identifiers for the software feature metadata objects, which match the search criteria. Providing the search results can include displaying the search results, such as displaying the metadata within the software feature metadata object and a list of the returned software feature metadata objects. Providing the search results can include making the returned software feature metadata objects available for access or to otherwise be used. For example, a returned software feature metadata object can be used to access the software artifact (e.g. programming code) embodying the software feature or to search for instances of integration of the software artifact into applications or other artifacts, such as described for process 300 in FIG. 3.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

EXAMPLE 4—EXAMPLE METHOD THAT SEARCHES A COLLECTION OF APPLICATIONS BASED ON A SOFTWARE FEATURE METADATA OBJECT

Figure 3:
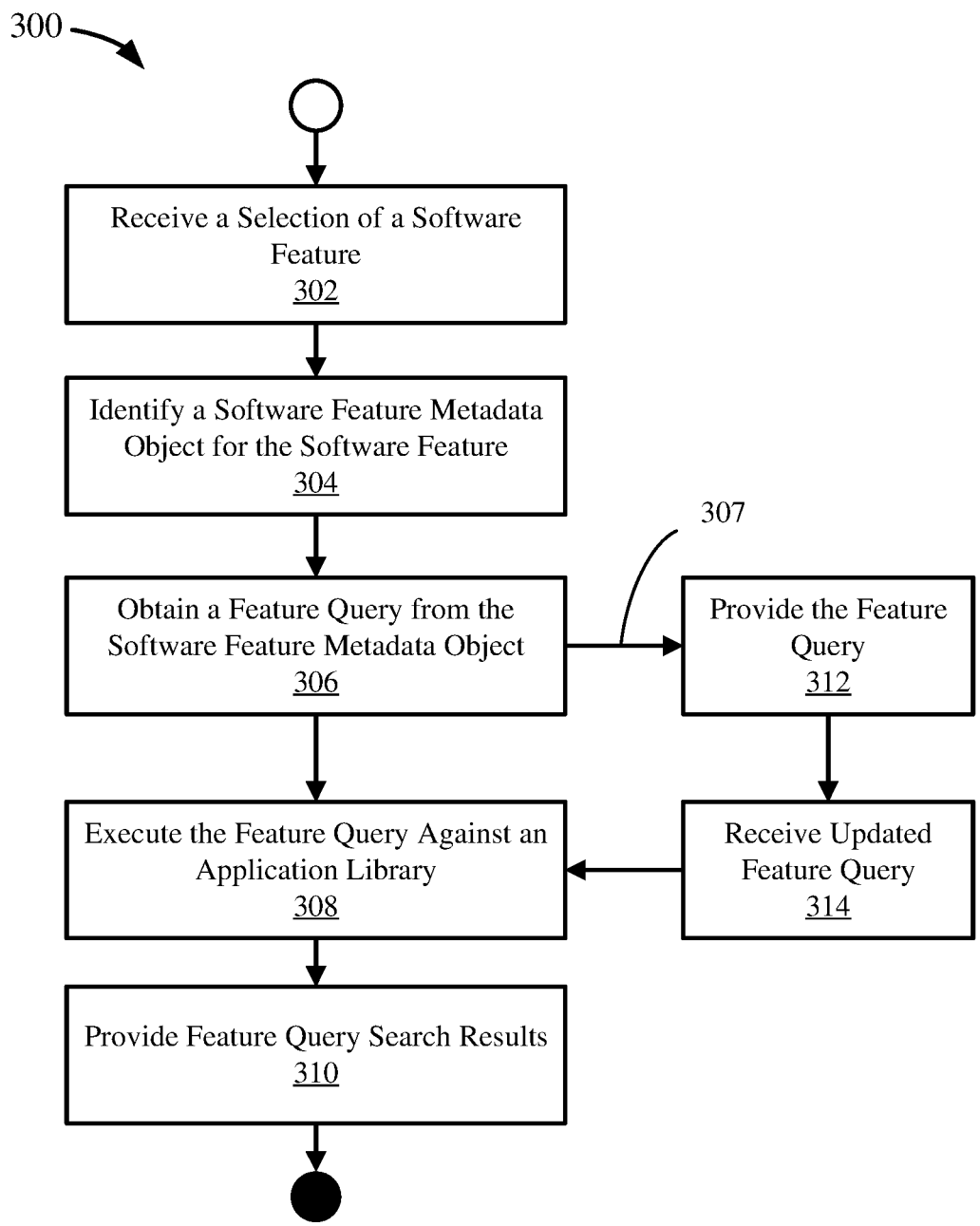
FIG. 3 is a flowchart of an example method of searching a collection of applications based on a software feature metadata object.

FIG. 3 is a flowchart of an example method 300 of searching a collection of applications based on a software feature metadata object and can be implemented, for example, by the system described in FIG. 1.

At 302, a selection of a software feature can be received. The selection can include a request to find instances of use of the software feature in software applications or programming code. In some embodiments, the request can be to perform an action based on or including the selected software feature, such as access the software artifact implementing the selected software feature, or other actions which can use the metadata stored in the software feature metadata object. The selection can include a name or other identifier for the software feature. For example, the selection can include an identifier for a software feature metadata object. The selection can be made from a set of available software features, such as can be provided in process 200 shown in FIG. 2.

At 304, a software feature metadata object can be identified. Identifying the software feature metadata object can be based on the selected software feature. For example, the selection of the software feature can include the identifier for the software feature metadata object, or a name that can be used to identify the corresponding software feature metadata object. Generally, the identified software feature metadata object represents a software artifact that embodies the selected software feature.

At 306, a feature query can be obtained from the identified software feature metadata object. The feature query obtained can include a search string or formatted query (e.g. a query ready for execution), a partial query or search string, additional query data (e.g. query type or query target location), or can include obtaining a feature query object containing a query and additional query data.

At 308, the feature query can be executed against an application library. Executing the query can include passing the query to the application library for execution (e.g. to a database management system). Executing the query can include searching the application library for zero or more applications which include the software artifact represented by the software feature metadata object based on the search criteria provided in the query. Generally, the feature query is an executable search string, which can be provided to a search engine or search function or method directly. In some cases, the feature query can include a partial search string and, in such cases, the search string can be formatted or completed before execution (e.g. such as concatenating a header for the search engine, etc.). Executing the query can include obtaining search results, which can include zero or more applications (e.g. references to the applications, such as names or other identifiers) meeting the search criteria (e.g. applications that integrate or otherwise use the software artifact). Search results can also include a count of the applications returned, or other data about the results.

At 310, the feature query search results can be provided. The feature query search results can include zero or more applications, or identifiers for the applications, which match the search criteria. Providing the search results can include displaying the search results, such as displaying a list of the applications having the software artifact corresponding to the feature query. Providing the search results can include making the returned applications available for access or to otherwise be used. Providing the search results can include providing statistical or analytical data about the results, such as a count of the number of applications returned or other data.

At 307, the process 300 can begin an additional or alternative embodiment, which can allow for editing or otherwise changing or altering the feature query before execution.

At 312, the feature query obtained at 306 can be provided, such as to a user or another system. Providing the feature query can include displaying the feature query. Further, the feature query can be provided in a changeable or editable format, thus the feature query can be adaptable on-the-fly, such as by a user.

At 314, an updated feature query can be received. The updated feature query can include the feature query obtained at 306, and can further include changes or additions to the feature query. In this way, starting at 307, a feature query obtained from a software feature metadata object can be configurable, such as by a user. A user can add or change search properties available, such as based on the query type. For example, a javascript search object can be provided at 312 as the feature query, such as "oSearchDefinitionForFlexibleColumnLayout=API.Service Definition.get FlexibleColumnLayout( )" The user can then update the search to be "oSearchDefinitionForFlexibleColumnLayout.addProperty("defaultTwoColumnLayoutType", "TwoColumnsMidExpanded")," or having typed setters: "setDefaultTwoColumnLayoutType("TwoColumnsMidExpanded")," which can then be received as the updated feature query at 314. Further, the feature query can be different, or be presented differently, based on the user requesting (e.g. administrator, developer, tester, analyst, and so on). In this way, a user can effectively utilize a feature query as a template for developing or refining a search more targeted for the user's particular goals.

The process 300 can be integrated with the process 200, as described herein. For example, the process 300 can begin at the completion of the process 200. As another example, the process 200 can be performed in place of or integrated with steps 302 and 304 in process 300. In this way, a user can search for a software feature and usage or other data about the software feature via the software feature metadata object, without needing detailed or special knowledge about the implementation of the software feature (e.g. the software artifact corresponding to the software feature metadata object).

A process similar to process 300 can be used to access the software artifact (e.g. the implementing code) for a software feature, or other actions regarding the software artifact for which metadata is stored in a corresponding software feature metadata object.

EXAMPLE 5—EXAMPLE SOFTWARE FEATURE METADATA OBJECT DEFINING A SOFTWARE ARTIFACT INTEGRATED IN SOFTWARE APPLICATIONS

Figure 4:
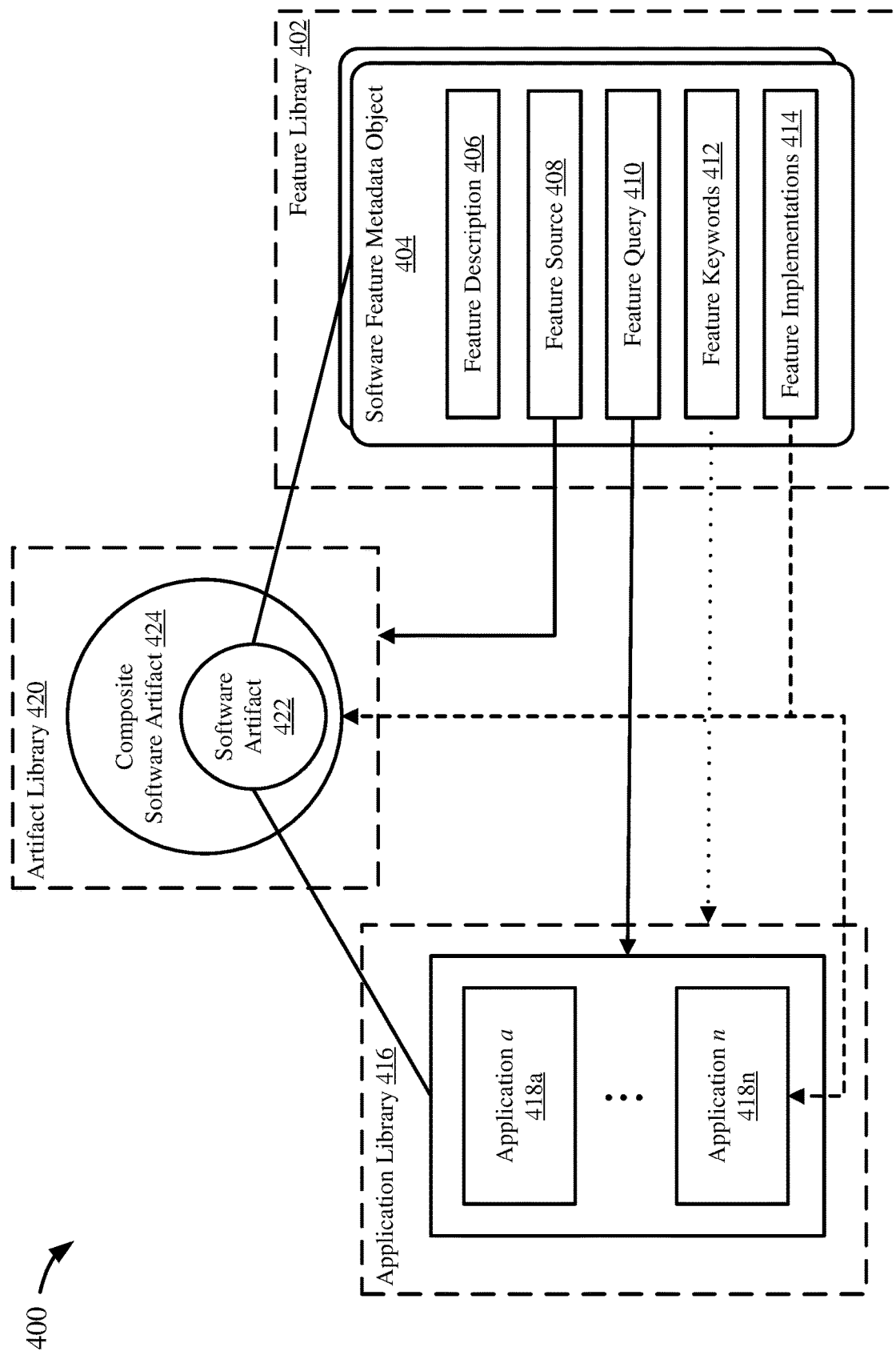
FIG. 4 is a block diagram of an example software feature metadata object, software artifact, and applications associations.

FIG. 4 is a block diagram of an example software feature metadata object, software artifact, and applications associations 400. One or more software feature metadata objects 404 can be stored and available in a feature library 402, as described herein. A software artifact 422 can be integrated, incorporated, or otherwise used in another software artifact, forming a composite software artifact 424. One or more software artifacts 422, 424 can be stored and available in an artifact library 420, as described herein. One or more applications 418*a-n* can be stored and available in an application library 416.

A software feature metadata object 404 can include metadata defining, at least in part, a software artifact 422. The software feature metadata object 404 can be linked to or otherwise associated with the software artifact 422. For example, the software feature metadata object 404 can include a name, ID number, or other unique identifier for the software artifact 422.

The software artifact 422 can be integrated, incorporated, or otherwise used in one or more software applications 418*a-n*.

The software feature metadata object 404 can include a feature description 406. The feature description 406 can include a name, title, or other descriptive data explaining or detailing the software feature encapsulated in the software artifact 422. In some embodiments, the feature description 406 can include a unique identifier, or combination of identifiers, for the software artifact 422. Generally, the feature description 406 can be human-understandable, for providing to a user for understanding the functionality implemented in the software artifact 422.

The software feature metadata object 404 can include a feature source 408. The feature source 408 can identify a file, location, database, or other source where the software artifact 422 is stored and from which can be retrieved. For example, the feature source 408 can include an identifier for the artifact library 420, or other reference or pointer to the artifact library. The feature source 408 can include a source type, indicating the nature of the source identified by the feature source. For example, the source type could include a file type or format for the artifact library 420. In some embodiments, the feature source 408 can include access or login information, such as for remotely accessing a database or other protected system.

The software feature metadata object 404 can include a feature query 410. The feature query 410 can include a search string or partial search string which, when executed, can identify and return one or more applications 418*a-n* implementing the software artifact 422 (e.g. return query results, such as identifiers for the applications or other query statistics, such as a count, of the applications). Because the feature query 410 is stored in the software feature metadata object 404, the feature query is reusable.

The feature query 410 can include one or more criteria for identifying the applications 418*a-n* implementing the software artifact 422. The feature query 410 can include a target for execution of the query, such as the application library 416, or may be executable against any searchable source having applications or programming code. The feature query 410 can include a query type, which can indicate the type of search string or query provided by the feature query 410. For example, a feature query 410 can be provided in a JavaScript format, which can be indicated in the query type. Thus, the feature query 410 can be executed against an application source or programming code source to determine the applications or programming code that incorporate the software artifact 422. In this way, usage of the software artifact 422 can be tracked and analyzed across an application library, or multiple application libraries.

The software feature metadata object 404 can include feature keywords 412. Feature keywords 412 can be data descriptors for the functionality, or portions of the functionality, implemented by the software artifact 422. The feature keywords 412 can be used to search for the software artifact 422 in programming code or applications in an application library 416, or for software artifacts that implement similar or related functionality as to that of the software artifact 422. The feature keywords 412 can be over-inclusive, in some cases, in finding implementations of the software artifact 422, such as compared to the feature query 410. However, these over-inclusive returned results, from searching using the keywords 412, can be beneficial to identify additional applications which may incorporate modifications of the software artifact 422, or incorrectly incorporate the software artifact, but which it may be desirable to identify.

The software feature metadata object 404 can include feature implementations 414. The feature implementations 414 can include identification of specific software artifacts or applications which are known to incorporate the software artifact 422. For example, the feature implementations 414 may include an identifier for the composite software artifact 424 which incorporates the software artifact 422. Additionally or alternatively, the feature implementations 414 can include an identifier for Application n 418*n* which incorporates the software artifact 422. Thus, the feature implementations 414 can delineate or otherwise identify occurrences of the software artifact 422. Such occurrences 418*n*, 424 of the software artifact 422 can be usefully identified to avoid under-identifying instances of use of the software artifact 422 by identifying applications or software artifacts where the software artifact 422 may be bundled with other functionality, and so hidden or not otherwise easily identifiable (e.g. such as by the feature query 410).

The components 406, 408, 410, 412, 414 of the software feature metadata object 404 generally provide data for understanding, accessing, and retrieving its associated software artifact 422, and for identifying instances of integration, incorporation, or other use of the software artifact in programming code or software applications. The components 406, 408, 410, 412, 414 can be respectively implemented as data variables, tags, or complex data structures including multiple variables. For example, the feature query 410 can include a feature query object having a search string or query and a search type, and further can have a target location, access information, or other data for executing the query.

A software feature metadata object 404 can include additional components as well. For example, a software feature metadata object 404 could include a type component, which could indicate a kind of implementation to which the object is directed, such as "feature" or "library."

EXAMPLE 6—IDENTIFYING A SOFTWARE ARTIFACT INTEGRATED IN A COMPOSITE SOFTWARE ARTIFACT IN SOFTWARE APPLICATIONS VIA SOFTWARE FEATURE METADATA OBJECTS

Figure 5:
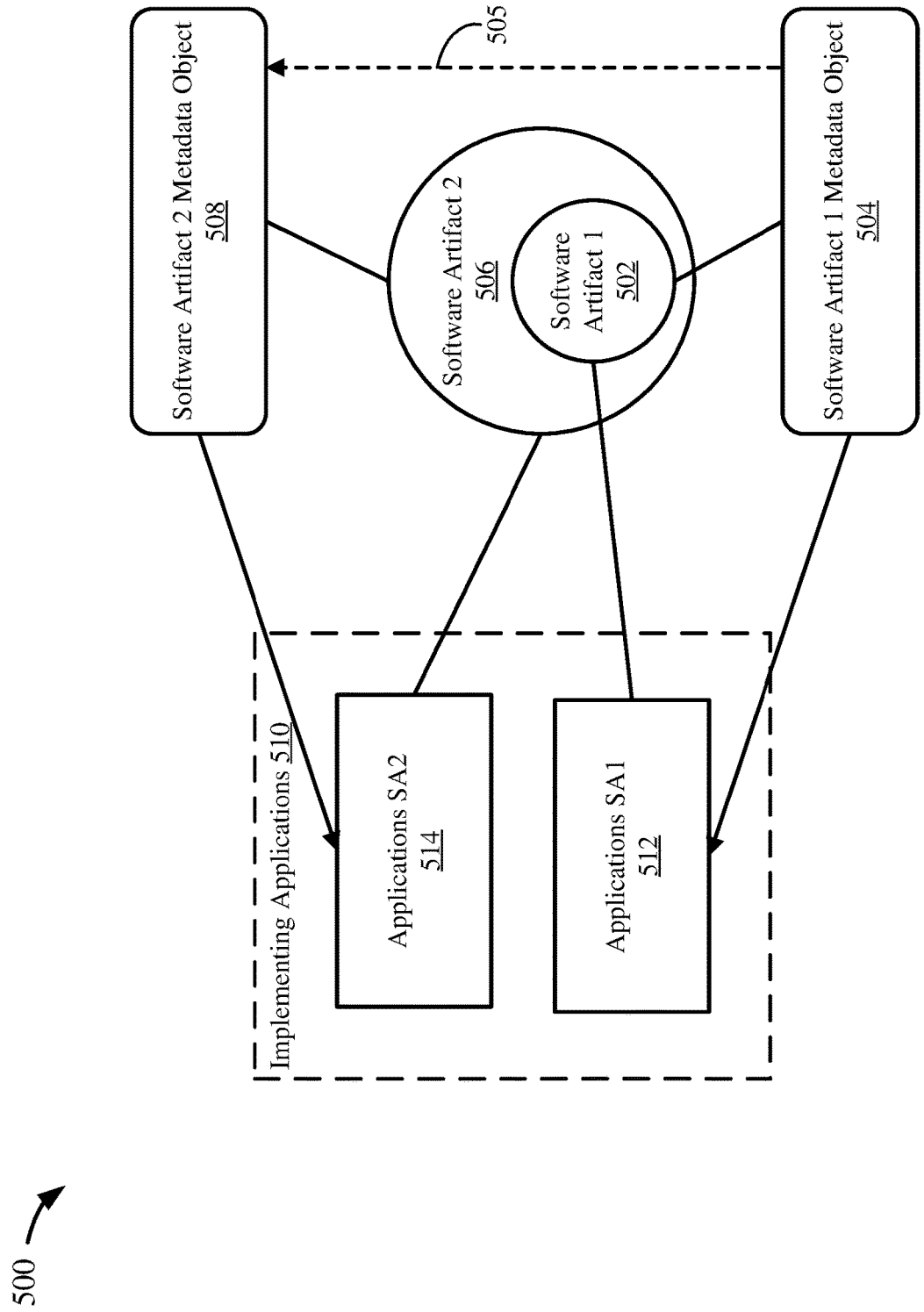
FIG. 5 is a block diagram of an example usage of software feature metadata objects for a software artifact and a composite software artifact.

FIG. 5 is a block diagram of an example usage 500 of software feature metadata objects for a software artifact and a composite software artifact.

A software artifact 1 502 can be integrated or otherwise used in one or more applications, such as Applications SA1 512. The software artifact 1 502 can also be integrated into software artifact 2 506. The software artifact 2 506 can be integrated into one or more applications, such as Applications SA2 514. Because software artifact 2 506 incorporates software artifact 1 502, both sets of applications, Applications SA1 512 and Applications SA2 514, incorporate software artifact 1 502, and so are the implementing applications 510 (of software artifact 1). In some cases, applications SA1 512 and applications SA2 514 can overlap, or be co-extensive, such as when an application integrates software artifact 1 502 while separately integrating software artifact 2 506 (and not just integrating software artifact 1 through software artifact 2).

Software artifact 1 502 can have software artifact 1 metadata object 504, which can be a software feature metadata object as described herein. The software artifact 1 metadata object 504 can include metadata, such as a feature query, for identifying applications SA1 512. Similarly, software artifact 2 506 can have software artifact 2 metadata object 508, which can similarly identify applications SA2 514.

The software artifact 1 metadata object 504 may not identify all applications incorporating software artifact 1 502 because some applications, such as applications SA2 514, incorporate the software artifact 1 through the composite software artifact 2 506, which the software artifact 1 metadata object may not be configured to identify. However, the software artifact 1 metadata object can include an indicator 505 (e.g. feature implementations as described herein) which can point to the software artifact 2 metadata object 508 (or, in some embodiments, point to the software artifact 2 506). Thus, the software artifact 1 metadata object can identify all implementing applications 510 for software artifact 1 502 by providing query information for identifying applications SA1 512 and by providing information 505 to access the composite software artifact 2's metadata object 508 because it integrates the software artifact 1. Thus, the query data for software artifact 2 506 can be retrieved from the software artifact 2 metadata object 508 and also executed, which can then provide the additional applications SA2 514 which integrate the software artifact 1 502 through the composite software artifact 2 506.

This functionality can be extended through either software feature metadata object 504, 508. For example, software artifact 1 metadata object 504 can include multiple indicators 505 for other composite software artifacts which integrate software artifact 1 502. Additionally or alternatively, software artifact 2 metadata object 508 can include one or more indicators for other composite software artifacts which integrate composite software artifact 2 506. Such chained software artifacts and their respective software feature metadata objects can be traversed and used in searching, as described herein.

EXAMPLE 7—SOFTWARE FEATURE METADATA OBJECT EXAMPLE IMPLEMENTATIONS

FIG. 6 depicts example software feature metadata object definitions 600. A first software feature metadata object 601 in part defines metadata for a software feature called "treetable," as described herein. The first software feature metadata object 601 includes an XPATH-type query for finding uses of the treetable feature, and provides specific occurrences of the treetable feature in two other software artifacts, "ListReport" and "ObjectPage."

A second software feature metadata object 603 in part defines metadata for a "ListReport" software feature, as described herein. The second software feature metadata object 603 includes an XPATH-type query for finding uses of the ListReport feature, and illustrates a software feature without other target or known occurrences. Thus, the ListReport feature may be a composite software artifact as it incorporates the Treetable feature, while the Treetable feature is not a composite software artifact.

A third software feature metadata object 605 in part defines metadata for an "Overview Page" software feature, as described herein. The third software feature metadata object 605 includes a JavaScript-type query for finding uses of the Overview Page feature, and illustrates a software feature without other target or known occurrences.

The software feature metadata objects 601, 603, 605 may be stored together, as shown, such as in a single file, with additional software feature metadata objects. In other embodiments, the software feature metadata objects 601, 603, 605 may be stored in separate files or locations, but remain available or otherwise accessible together in a feature library or through a feature metadata API, as described herein.

Generally, the software feature metadata objects 601, 603, 605 can define what, where, and how to search for the related software feature implementations. For example, the "source" may identify the location to search using the "searchQuery" executed based on the "searchQueryLanguage." The "description" field can be searched for finding particular software features via an API for software feature metadata objects 601, 603, 605, as described herein. Additionally or alternatively, a link or other indicator, such as the "documentationLink" can be provided, which can be used for accessing additional documentation for the related software feature. Such documentation can describe how a software feature operates, how it appears in a UI, parameters available for tuning the software feature, and the like.

EXAMPLE 8—EXAMPLE SOFTWARE FEATURES

In any of the examples herein, a software feature can be a defined, distinct, or particular piece of functionality which can be performed or executed in a software application. Generally, a software feature can be implemented or embodied in a software artifact, or in some cases, multiple software artifacts. FIG. 6 illustrates three software feature metadata objects, each representing a different software feature: a tree table software feature 601, a list report software feature 603, and an overview page software feature 605.

EXAMPLE 9—EXAMPLE SOFTWARE ARTIFACTS AND EXAMPLE COMPOSITE SOFTWARE ARTIFACTS

In any of the examples herein, a software artifact can be a data object used in software. For example, a software artifact can be programming code or a code segment, a function or method, a library or API, a template, a screen or GUI definition, or the like. A software artifact can further be an executable binary, such as from programming code, a file, setting or configuration object, a software application, a service, or the like. A software artifact can have an identifier (e.g. a unique identifier), such as a name (e.g. function name, library name, or the like) or ID number, which can be used as a pointer or reference to the software artifact. In some cases, an identifier can be used to invoke the software artifact. Generally, a software artifact encapsulates or embodies the functionality of a software feature. A software artifact can be used in software development, such as by integrating, accessing, or otherwise incorporating the software artifact into an application.

A composite software artifact can be a software artifact which includes, integrates, incorporates, or the like, one or more other software artifacts. A composite software artifact can include, for example, the programming code from another software artifact (e.g. a copy of the software artifact, in whole or in part), or can include a reference to the software artifact (e.g. a function call or a library name) without including the software artifact itself (or a copy). Thus, a composite software artifact can be composed of multiple other software artifacts which embody multiple software features.

In some embodiments, a composite software artifact can include switchable software artifacts. A switchable software artifact can be a software artifact that can be switched "on" or "off" within the composite software artifact. A switchable software artifact within a composite artifact can be switched based on parameters, such as can be provided to the composite software artifact. Additionally or alternatively, a switchable software artifact can be switched by a user, such as when the composite software artifact is built into an application, or via configuration of the application.

EXAMPLE 10—APPLICATION AND PROGRAMMING CODE

In any of the examples herein, an application can be an executable program, an interpretable program, or other software which can perform actions or operations, or be executed or otherwise processed to perform actions or operations. An application can be an executable file, or the source code for the executable file (or both, in cases of interpreted programs or programming languages). In some instances, an application can be interpretable code. An application can include metadata. An application can be a software artifact, and can generally include one or more other software artifacts.

Programming code can include a file or set of files storing the programming code. An application or a software artifact can include programming code. Programming code can be a specific implementation of a software feature, and can be source code for an application.

EXAMPLE 11—EXAMPLE METADATA-DEFINED SOFTWARE ARTIFACTS AND METADATA-DEFINED APPLICATIONS

In any of the examples herein, a software artifact (including composite software artifacts) or an application can be a metadata-defined software artifact or metadata-defined application. For example, a software artifact can include metadata which, in whole or in part, defines the software artifact or application. Metadata-defined software artifacts or applications can include metadata that provides software features or functionality, additional information about the software artifact, application, and/or its features. In such cases, the metadata within a metadata-defined software artifact or application can be interpreted or executed, or used to cause execution of, programming functionality. In this way, the metadata within a metadata-defined software artifact or application can trigger software features.

Further, the metadata within a metadata-defined software artifact or application can be searched to identify the software features within the artifact, such as by a feature query, as described herein. Additionally or alternatively, metadata within a metadata-defined software artifact or application can include one or more tags identifying software features within the metadata-defined software artifact or application, as described herein, which can be detected in a search for the tagged software features, such as by a feature query as described herein.

For metadata-defined composite software artifacts, the metadata of composite software artifact can include information about the additional software artifacts included or references in the composite software artifact, such as a list of their identifiers.

Searchable metadata can be found in a variety of different software artifact files, such as manifest, annotations, UI objects, extensions, and so on, which can be in variety of formats, such as json or XML files. The following is an example of a code for a software feature that can be identified by a query from a software feature metadata object:

```
<template:elseif test=" {= $}parts:[{path:'facet>'}, {path:'parameter>/settings'}],
formatter:
'sap.suite.ui.generic.template.js.AnnotationHelper.determineTableType'}==='TreeTable'
|| ...
<table:TreeTable id='{path: 'facet>', ...}
>
```

EXAMPLE 12—SOFTWARE ARTIFACT ANALYSIS, TRACKING, OR REPORTING

In any of the examples herein, software feature metadata objects can be used to obtain usage data or otherwise track usage of software artifacts. A software feature metadata object can be accessed to provide detailed information for searching for applications or software artifacts that integrate or otherwise use its associated software artifact.

For example, the process 300 shown in FIG. 3 can be used to find applications which use a given software artifact, and to obtain data about the usage of the software artifact, such as the number of applications. Such software artifact usage data can thus be collected and stored, such as in a tracking/reporting system as described herein, to track the software artifact usage. Further, reporting on the software artifact usage can be provided, such as through a user interface (e.g. displaying the data) or by generating a report which can be provided to a user.

Aggregate data, such as the number of applications which use a software artifact, can be collected on the software artifact by accessing and using the feature query, for example, in its software feature metadata object. Detailed data as well can be similarly collected, such as which developers/customers use the software artifact the most or other information that can be obtained from application metadata. The software feature metadata object enables such data collection for a software artifact by providing defined queries for identifying the software artifact in programming code or applications, and other metadata for the software artifact.

EXAMPLE 13—SOFTWARE FEATURE METADATA OBJECT MULTIPLICITY OF METADATA

In any of the examples herein, a software feature metadata object can have a multiplicity of a given metadata variable, component, or object. For example, a software feature metadata object can include a feature query. In some cases, the software feature metadata object can include multiple feature queries, such as for execution against different application libraries or other databases. For example, the software feature metadata object may target two different databases, one which is accessible through SQL queries and another through text search strings. The software feature metadata object can have two feature queries (e.g. feature query objects) which contain query metadata (such as the query itself, the query type, the query target) for the separate query targets (databases). In this way, a software feature metadata object can provide complete metadata information for its corresponding software artifact across multiple environments.

EXAMPLE 14—SOFTWARE FEATURE METADATA OBJECT AND SOFTWARE ARTIFACT TAGGING

In any of the examples herein, a software artifact can include a tag, keyword, or metadata which can be used by its corresponding software feature metadata object for recognition or identification. Such a tag can be included in the software artifact at design time (e.g. during development or maintenance), and the software feature metadata object can include metadata identifying the tag used. For example, a feature query in the software feature metadata object can include the tag included in the software artifact (e.g. the query can be designed to search for the tag, at least in part).

EXAMPLE 15—CODE METADATA MODULE ENVIRONMENTS

Figure 7A:
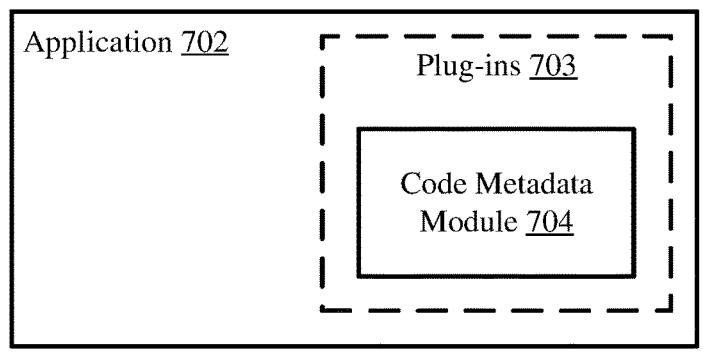
FIG. 7A is an exemplary application environment for a code metadata module.

FIG. 7A is a schematic diagram depicting an application environment for a code metadata module 704, which may provide software feature metadata object functionality as described herein. An application 702, such as a software application running in a computing environment, may have one or more plug-ins 703 (or add-ins or other software extensions to programs) that add functionality to, or otherwise enhance, the application. The code metadata module 704 may be integrated with the application 702; for example, the code metadata module may be integrated as a plug-in. The code metadata module 704 may add functionality to the application 702 for software feature metadata objects, which may be displayed in a user interface or otherwise provided to a user. For example, the application 702 may be a data management/analytics application or a software development or IDE application, and the code metadata module 704 may be integrated with the data management/analytics application or a software development or IDE application to software feature metadata object functionality.

Figure 7B:
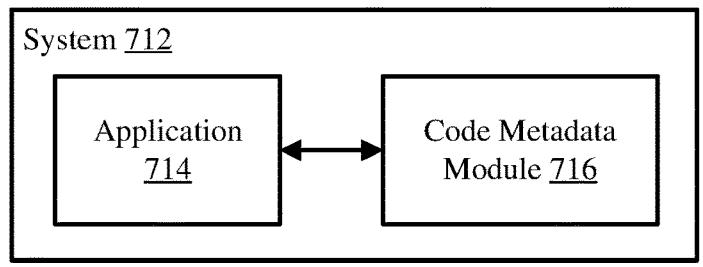
FIG. 7B is an exemplary system environment for a code metadata module.

FIG. 7B is a schematic diagram depicting a system environment for a code metadata module 716, which may provide software feature metadata object functionality as described herein. The code metadata module 716 may be integrated with a computer system 712. The computer system 712 may include an operating system, or otherwise be a software platform, and the code metadata module 716 may be an application or service running in the operating system or platform, or the code metadata module may be integrated within the operating system or platform as a service or functionality provided through the operating system or platform. The system 712 may be a server or other networked computer or file system. Additionally or alternatively, the code metadata module 716 may communicate with and provide software feature metadata object functionality, as described herein, to one or more applications 714, such as a data management/analytics application or a software development or IDE application, in the system 712.

Figure 7C:
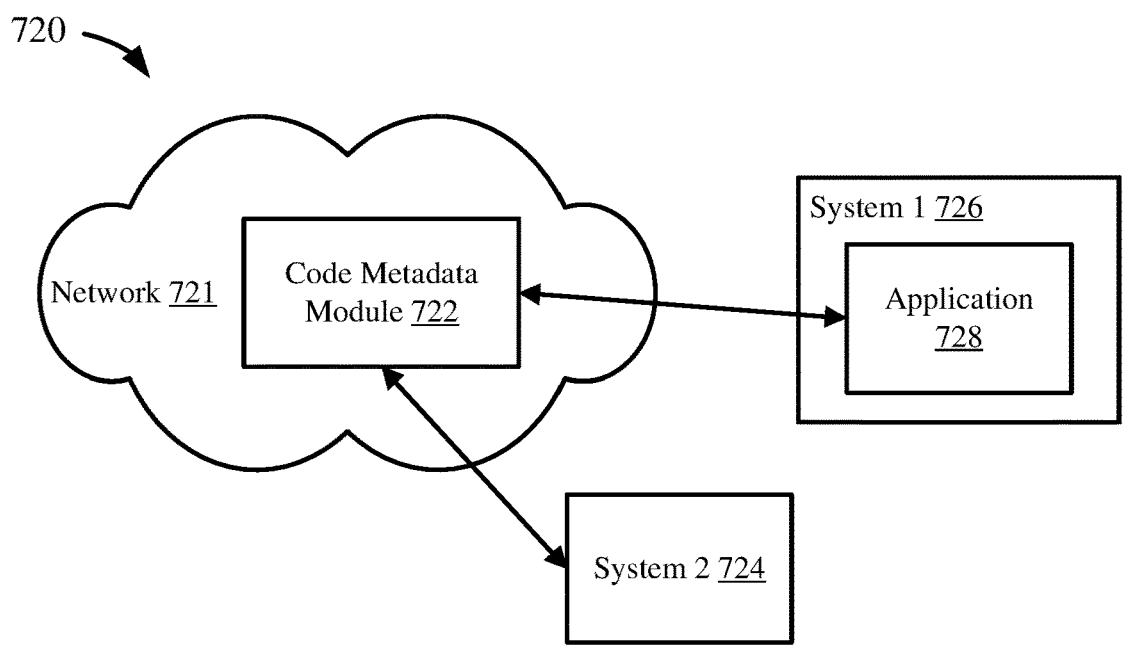
FIG. 7C is an exemplary network environment for a code metadata module.

FIG. 7C is a schematic diagram depicting a network environment 720 for a code metadata module 722, which may provide software feature metadata object functionality as described herein. The code metadata module 722 may be available on a network 721, or integrated with a system (such as from FIG. 7B) on a network. Such a network 721 may be a cloud network or a local network. The code metadata module 722 may be available as a service to other systems on the network 721 or that have access to the network (e.g., may be on-demand software or SaaS). For example, system 2 724 may be part of, or have access to, the network 721, and so can utilize software feature metadata object functionality from the code metadata module 722. Additionally, system 1 726, which may be part of or have access to the network 721, may have one or more applications, such as application 728, that may utilize software feature metadata object functionality from the code metadata module 722.

In these ways, the code metadata module 704, 716, 722 may be integrated into an application, a system, or a network, to provide software feature metadata object functionality as described herein.

EXAMPLE 16—COMPUTING SYSTEMS

Figure 8:
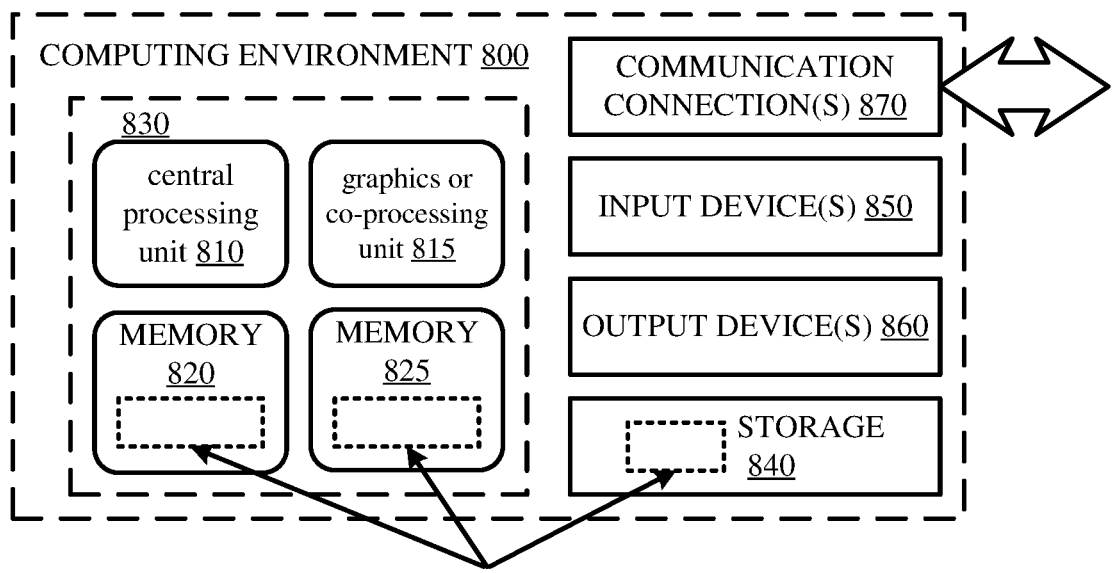
FIG. 8 is a diagram of an example computing system in which described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the processes of FIGS. 2 and 3, the systems of FIGS. 1 and 7A-C, and the data, data representations, metadata, or data structures of FIGS. 4, 5, and 6. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815. The memory 820, 825, may also store settings or settings characteristics, databases, software artifacts, metadata objects, interfaces, or data associations or representations shown in FIGS. 4, 5, and 6, the systems shown in FIGS. 1 and 7A-C, or the steps of the processes shown in FIGS. 2 and 3.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 17—CLOUD COMPUTING ENVIRONMENT

Figure 9:
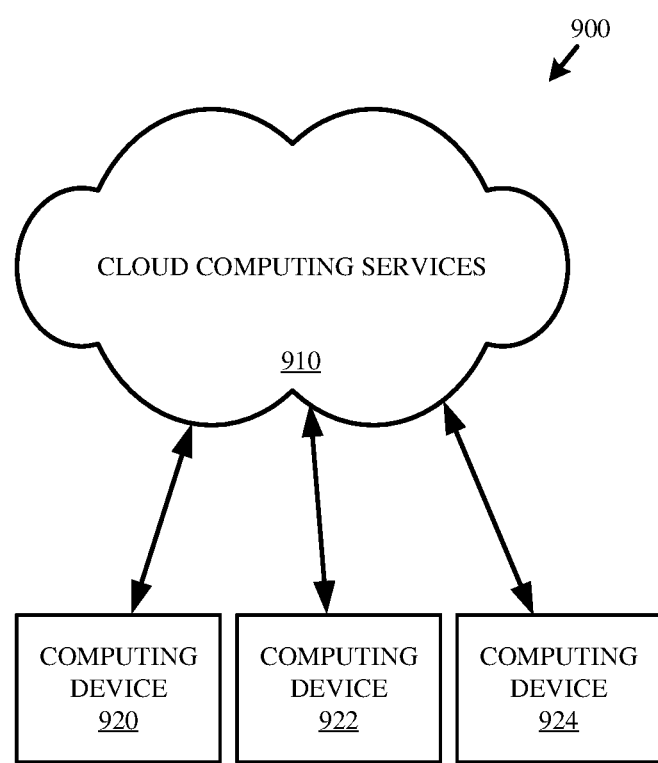
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

EXAMPLE 18—IMPLEMENTATIONS

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

EXAMPLE 19—ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by one or more computing devices comprising at least one hardware processor and one or more tangible memories coupled to the at least one hardware processor, of identifying programming code, the method comprising:
  receiving a user-provided search query for a programming feature, wherein the search query comprises a description of the programming feature;
  executing the search query against a collection of feature definitions in a feature library of programming features, wherein the collection of feature definitions comprises feature metadata objects respectively mapping programming features to software artifacts via feature queries respectively stored in the feature metadata objects;
  responsive to finding a feature metadata object that satisfies the search query, outputting a feature query and a feature query type stored in the feature metadata object, wherein the feature query comprises one or more search criteria for identifying software artifacts having the programming feature, wherein the feature query type at least in part identifies how to execute the feature query; and
  executing the feature query against an application library to identify one or more applications having the programming feature based on the one or more search criteria and the feature query type.

2. The method of claim 1, further comprising:
  retrieving the identified one or more applications having the programming feature.

3. The method of claim 1, further comprising:
  receiving an updated feature query in response to outputting the feature query; and
  wherein the executing comprises executing the updated feature query against the application library.

4. The method of claim 1, further comprising:
  displaying the one or more applications having the programming feature.

5. The method of claim 1, further comprising:
generating a report comprising the one or more applications having the programming feature.

6. The method of claim 1, wherein the outputting further comprises outputting a feature source at least in part identifying a programming feature location of a software artifact for the programming feature.

7. The method of claim 6, further comprising:
retrieving a source code of the programming feature from the programming feature location based at least in part on the feature source.

8. One or more non-transitory computer-readable storage media storing computer-executable instructions that, when executed, cause a computing system to perform a method of searching code segments, the method comprising:
receiving a programming feature request comprising one or more programming feature criteria;
searching a feature library for available programming features meeting the one or more programming feature criteria;
responsive to the searching, receiving a set of available programming features from the feature library;
displaying the set of available programming features from the feature library;
receiving a selection of a target programming feature from the set of available programming features;
obtaining a feature query stored in a feature metadata object of the target programming feature, wherein the feature query comprises one or more search criteria for identifying applications having the target programming feature;
obtaining a feature query type via the feature metadata object of the target programming feature, wherein the feature query type at least in part identifies how to execute the feature query;
executing the feature query against an application library to identify one or more applications having the target programming feature, wherein executing the feature query is based on the one or more search criteria and the feature query type; and
displaying results of the executed feature query.

9. The one or more non-transitory computer-readable storage media of claim 8, the method further comprising:
displaying the feature query obtained via the feature metadata object;
receiving an updated feature query; and
wherein the executing comprises executing the updated feature query.

10. The one or more non-transitory computer-readable storage media of claim 8, the method further comprising:
obtaining a feature query target location via the feature metadata object of the target programming feature; and
wherein executing the feature query is at least in part based on the feature query target location.

11. The one or more non-transitory computer-readable storage media of claim 8, the method further comprising:
obtaining a feature implementation object via the feature metadata object of the target programming feature, wherein the feature implementation object identifies a composite programming feature incorporating the target programming feature;
accessing an additional feature metadata object for the identified composite programming feature based on the feature implementation object;
obtaining an additional feature query via the additional feature metadata object of the composite programming feature; and executing the additional feature query against the application library in addition to the feature query.

12. The one or more non-transitory computer-readable storage media of claim 8, the method further comprising:
obtaining a feature keyword via the feature metadata object of the target programming feature; and
executing a keyword search against the application library using the feature keyword.

13. The one or more non-transitory computer-readable storage media of claim 8, wherein executing the feature query comprises searching metadata of one or more applications in the application library based at least in part on the one or more search criteria in the feature query.

14. The one or more non-transitory computer-readable storage media of claim 8, wherein the results include a count of the one or more applications having the target programming feature.

15. The one or more non-transitory computer-readable storage media of claim 8, the method further comprising:
generating a report based at least in part on the results detailing usage of the target programming feature.

16. A system of application feature identification, the system comprising:
one or more memories;
one or more processing units coupled to the one or more memories; and
one or more computer-readable storage media storing instructions that, when loaded into the one or more memories, cause the one or more processing units to perform software artifact discovery operations comprising:
receiving a request for available features of a feature library comprising one or more feature metadata objects respectively defining one or more available features;
responsive to receiving the request, providing one or more feature identifiers of the available features of the feature library;
receiving a selection of a target feature of the one or more available features, wherein the selection comprises a target feature identifier selected from the one or more feature identifiers;
accessing a target feature metadata object in the feature library based on the target feature identifier from the received selection, wherein the target feature metadata object represents a software artifact encapsulating the target feature;
retrieving a feature query from the target feature metadata object, wherein the feature query comprises one or more search criteria for identifying programming code sources having the software artifact encapsulating the target feature defined in the target feature metadata object;
obtaining a feature query type via the target feature metadata object, wherein the feature query type at least in part identifies how to execute the feature query;
executing the feature query based on the one or more search criteria and the feature query type against a programming code library having programming code sources;

receiving results based on the executed search, wherein the results comprise programming code source identifiers identifying programming code sources having the software artifact encapsulating the target feature identified in the target feature metadata object; and providing the programming code source identifiers of the results of the executed search.

\* \* \* \* \*